United States Patent Office 2,768,979
Patented Oct. 30, 1956

2,768,979

PRODUCTION OF 1,5-PENTANEDIOL FROM FURFURAL

Kenneth O. Hambrock and James A. Robertson, Lewiston, N. Y., assignors to E. I. du Pont de Nemours & Company, Wilmington, Del., a corporation of Delaware No Drawing. Application July 10, 1952, Serial No. 298,211

5 Claims. (Cl. 260—635)

This invention relates to the production of pentanediols and more particularly to the production of 1,5-pentanediol.

It has heretofore been proposed to hydrogenate furfural in the liquid phase and at elevated temperatures and pressures over a catalyst. British Patent 627,293, for example, discloses a furfural hydrogenation process utilizing cobalt and copper catalysts but, in addition, mentions such prior art catalytic agents as the oxides of copper, chromium and the alkali and alkaline earth metals. The British process produces furfuryl and tetrahydrofurfuryl alcohols over a foraminous cobalt catalyst and furfuryl alcohol and a mixture of pentanediols over foraminous copper.

The pentanediols show promise as useful organic synthetic intermediates and as solvents. Of these compounds 1,5-pentanediol is of especial interest because of its symmetrical nature. A general object of our invention is therefore the production of pentanediols. A more specific object is the production of 1,5-pentanediol. Another object is production of pentanediols from furfural. A further object of the invention is development of a catalytic method for producing pentanediols from furfural. Still further objects will be evident from the remainder of this specification.

According to the present invention furfural is hydrogenated continuously in the liquid phase by passage, together with hydrogen, through a bed of a foraminous cobalt catalyst at pressures above atmospheric and temperatures ranging between about 125°–225° C., 200° C. representing the preferred value. Since these hydrogenations are highly exothermic, the furfural is preferably diluted with an inert solvent before the reaction is carried out. By varying the conditions employed, including particularly temperatures and the quantity of inert diluent, the identity of the products and the ratio of one product to another can be changed. Under the proper conditions however a yield of up to about 65% 1,5-pentanediol can be obtained. It may be noted that the cobalt catalytic process of British Patent 627,293 is carried out at temperatures never exceeding 100° C.

The foraminous cobalt catalysts used in the present invention are prepared by treating an alloy of cobalt, in particulate form, with a material capable of dissolving out the alloying metal. Either an acid or a base may serve to remove this alloying metal, choice being dependent upon the nature of the latter. In each case removal of the alloyed material produces a granular catalyst with a large active surface. Suitable alloying agents are aluminum, zinc and silicon, aluminum being preferred. A usable catalyst was prepared by adding two 57.5 g. samples of a Raney cobalt alloy to 240 g. of a 5% NaOH solution. The alloy, containing 70% aluminum and 30% cobalt, was in the form of particles ranging in size from 20 mesh to ⅜″. The reaction was vigorously exothermic, with brisk evolution of hydrogen. When visible evolution of gas had ceased, the supernatant liquid was decanted off, the solid residue washed twice with distilled water and then allowed to stand in rinse water overnight. Although the average particle size was reduced to some extent by the reaction, the most important effect was irregular hollowing out of the individual particles. About 15–20% of the aluminum was dissolved out by the caustic. The resultant foraminous cobalt possessed a very large total surface area and enhanced catalytic activity. Cobalt alloys containing different percentages of alloying metal may of course be employed. The procedure of this paragraph is essentially that of British Patent 658,863 and is given solely by way of example. Other conventional procedures may be substituted for that shown.

The diluent preferred for use with furfural in our process is tetrahydrofurfuryl alcohol (THFA). The quantity of diluent employed may vary but should usually comprise not less than about twice the volume of furfural with which it is admixed. Preferably however THFA will form a much greater proportion of the liquid reactant, up to 90 or even 95% by volume of the total mixture for example. Other diluents may be substituted for THFA provided that they are solvents possessing the required relative inertness, i. e., they must not react with furfural, with hydrogen or with the catalyst in such a manner as to interfere with the desired reaction. Usable solvents include alcohols such as methyl, ethyl and propyl, glycols such as ethylene glycol, methyl cellosolve (methoxyethanol) and ethyl cellosolve (ethoxyethanol), oxides such as ethers and 1,4-dioxane, liquid hydrocarbons such as toluene, esters such as methyl acetate and nitrogeneous compounds such as dimethyl formamide. Aqueous solutions of furfural solvents may also be used although water alone does not dissolve the reactant. In general, relatively inert organic solvents are satisfactory since their main function is to dilute the reactive furfural and prevent run-away reactions. Best results were obtained with the preferred THFA and with methyl cellosolve, compounds possessing both ether and hydroxyl groups.

In our process the liquid mixture of tetrahydrofurfuryl alcohol and furfural are passed through a bed of the catalyst prepared as described above while hydrogen gas under pressure is simultaneously passed through the same bed. The liquids flow past the catalyst at a space velocity which may be varied within limits. Generally a range of about 0.05 to 0.5 v. v. hr. is preferred. Values lower than 0.05 are impracticably slow and values much higher than 0.5 yield an increasing amount of by-products. The letters v. v. hr. represent the volume of liquid pumped per unit volume of catalyst bed per hour. The figures shown refer to the volume of furfural present and will be higher if the bulk of solvent be included. The pressure of the hydrogen is not sharply critical. Below about 10 atmospheres however the reaction does not proceed to any great extent, hydrogenation for example being almost negligible at around 500 lbs./in.² A good working pressure is about 4400 lbs./in.² but the upper limit is set only by the physical strength of the apparatus utilized.

A variable of more critical importance than either the space velocity of liquid flow or the pressure of hydrogen is the temperature employed. The preferred range lies between about 125° and 225° C. Around the lower limit of this range quantities of tetrahydrofurfuryl alcohol are formed by the hydrogenation. Thus for example at 110° C. THFA is about the only product. Mixtures largely consisting of THFA and 1,5-pentanediol appear at intermediate temperatures, the maximum yields of 1,5-pentanediol being obtained at around 200° C. By-products, usually formed, increase at still higher temperatures and at above 225° C. begin to detract materially from the yield of 1,5-pentanediol. The principal materials produced in addition to THFA and 1,5-pentanediol are 1,2-pentanediol, methyltetrahydrofuran, 2-pentanol and 1- pentanol. Generally these products can be separated by distillation. The instant process can consequently be used to prepare any of the compounds enumerated.

By way of illustrating our invention the following examples are given:

Example 1

A run was made passing a liquid mixture of two volumes of tetrahydrofurfuryl alcohol and one volume of furfural through 472 g. or about 500 cc. of foraminous cobalt catalyst prepared as described above. Temperature was maintained at around 132.5° C. while the rate of flow of the mixture was 635 cc./hr. Hydrogen was supplied to the catalyst bed simultaneously with the liquid at a pressure of about 4400 lbs./in.$^2$ and was vented at a rate of 45 l./min. Analysis of the product showed a complete conversion of furfural with a yield of 82% tetrahydrofurfuryl alcohol, 9.2% 1,5-pentanediol, 4.4% methyltetrahydrofuran and 1% 1-pentanol. These products were separated by distillation.

Example 2

The procedure of Example 1 was repeated except that the temperature was increased to about 174° C. and the feed of furfural and THFA decreased to 302 cc./hr. Separation of the products showed a yield of 56.1% THFA, 18.6% 1,5-pentanediol, 3.7% 1,2-pentanediol, 11.2% methyltetrahydrofuran and 8.0% 2-pentanol.

Example 3

The procedure of Example 2 was repeated except that a temperature of around 200° C. was utilized. The separated products included 24.7% THFA, 36.5% 1,5-pentanediol, 6.9% 1,2-pentanediol, 7.3% methyltetrahydrofuran, 9.3% 2-pentanol and 8.8% 1-pentanol.

Example 4

A liquid mixture containing 10% by volume of furfural and 90% of THFA was passed through the catalyst of the previous examples at a space velocity of 0.05 v. v. hr. based on furfural or about 0.5 v. v. hr. based on the total liquid volume. A yield of 65% 1,5-pentanediol was obtained at 200° C. No THFA or 1,2-pentanediol was formed. The principal by-products were 12.2% methyltetrahydrofuran, 13.2% 2-pentanol and 2.3% 1-pentanol. The percentages given are, like those shown above, based upon initial weight of furfural employed.

It will be seen from the examples that our new process, hydrogenating diluted furfural over a foraminous cobalt catalyst at temperatures above 125° C., has achieved the objects of the invention. These examples, however, may be modified in various ways which will be evident to those skilled in the art from the general considerations outlined above. Still other changes may be made without departing from the spirit of the invention. The mixed products may, for instance, be separated by means other than distillation, such as selective chemical reaction. We wish, consequently, to be bound solely by the appended claims.

Having described our invention, we claim:

1. The method of continuously producing 1,5-pentanediol which comprises continuously passing liquid furfural admixed with an inert solvent and hydrogen under superatmospheric pressure through a foraminous cobalt catalyst at a temperature of about 125–225° C. and subsequently separating said 1,5-pentanediol from the crude product.

2. The method of claim 1 in which the inert solvent is tetrahydrofurfuryl alcohol.

3. The method of claim 2 in which the furfural is admixed with at least twice its volume of tetrahydrofurfuryl alcohol.

4. The method of claim 2 in which the space velocity of the liquid is about 0.05–0.5 v. v. hr.

5. The method of continuously producing 1,5-pentanediol in the substantial absence of isomeric diols which comprises passing, at about 200° C., a liquid mixture of about 10% by volume of furfural and about 90% by volume of tetrahydrofurfuryl alcohol through a foraminous cobalt catalyst at a space velocity of about 0.05 v. v. hr. simultaneously with hydrogen gas under superatmospheric pressure.

References Cited in the file of this patent

UNITED STATES PATENTS

| 2,497,812 | Copelin | Feb. 14, 1950 |
| 2,546,019 | Smith | Mar. 20, 1951 |

FOREIGN PATENTS

| 605,922 | Great Britain | Aug. 3, 1948 |
| 627,293 | Great Britain | Aug. 5, 1949 |

OTHER REFERENCES

H. Adkins: Reactions of Hydrogen, etc. (1937), page 134.

Iowa State Coll. Jour. of Science, vol. 12 (1937) (Menzel), pp. 142–144.

Bull. Soc. Chim. de France (1947) (Paul), pp. 165–168.

Ind. and Eng. Chem. (Wojcik), pp. 211 and 216 (February 1948).